United States Patent
Antonakakis et al.

(10) Patent No.: US 10,009,376 B2
(45) Date of Patent: Jun. 26, 2018

(54) NETWORK-BASED SECURE INPUT/OUTPUT (I/O) MODULE (SIOM)

(71) Applicant: NCR Corporation, Duluth, GA (US)

(72) Inventors: Stavros Antonakakis, Lake Mary, FL (US); Erick Kobres, Lawrenceville, GA (US); Bradley William Corrion, Chandler, AZ (US)

(73) Assignee: NCR Corporation, Atlanta, GA (US)

(*) Notice: Subject to any disclaimer, the term of this patent is extended or adjusted under 35 U.S.C. 154(b) by 0 days. days.

(21) Appl. No.: 14/553,413

(22) Filed: Nov. 25, 2014

(65) Prior Publication Data
US 2016/0149952 A1 May 26, 2016

(51) Int. Cl.
*H04L 29/06* (2006.01)
*H04L 12/24* (2006.01)
*H04L 29/08* (2006.01)
*G06Q 20/20* (2012.01)

(52) U.S. Cl.
CPC .......... *H04L 63/20* (2013.01); *H04L 41/0806* (2013.01); *H04L 67/14* (2013.01); *G06Q 20/202* (2013.01)

(58) Field of Classification Search
CPC ........ H04W 12/06; H04W 8/005; H04B 7/24; G06Q 20/20; H04L 41/28
USPC ............................................ 345/156; 726/17
See application file for complete search history.

(56) References Cited

U.S. PATENT DOCUMENTS

| | | | | |
|---|---|---|---|---|
| 6,975,727 | B1* | 12/2005 | Vandergeest | H04L 9/0891 380/273 |
| 7,121,460 | B1* | 10/2006 | Parsons | G06Q 20/341 235/379 |
| 2002/0099634 | A1* | 7/2002 | Coutts | G06Q 20/1085 705/35 |
| 2008/0320587 | A1* | 12/2008 | Vauclair | H04L 41/28 726/17 |
| 2009/0103726 | A1* | 4/2009 | Ahmed | H04L 9/0668 380/46 |
| 2011/0138458 | A1* | 6/2011 | Kumar | H04L 63/18 726/15 |

(Continued)

FOREIGN PATENT DOCUMENTS

| | | |
|---|---|---|
| EP | 2704078 | 3/2014 |
| EP | 2747370 | 6/2014 |

OTHER PUBLICATIONS

European Search Report dated Mar. 24, 2016 in co-pending European Patent Application No. 15190415.8.

*Primary Examiner* — Brian F Shaw
(74) *Attorney, Agent, or Firm* — Schwegman, Lundberg & Woessner

(57) ABSTRACT

A Secure Input/Output (I/O) Module (SIOM) is networked-enabled providing secure communications with terminals and peripherals integrated into the terminals. Communications between devices are securely made through encrypted communication sessions provisioned, defined, and managed through a secure protocol using the network-based SIOM. In an embodiment, a single-tenant network-based SIOM is provided. In an embodiment, a hybrid dual single-tenant and multi-tenant network-based SIOM is provided. In an embodiment, a multi-tenant network-based SIOM is provided. In an embodiment, a cloud-based SIOM is provided.

20 Claims, 6 Drawing Sheets

(56) References Cited

U.S. PATENT DOCUMENTS

2013/0171939 A1* 7/2013 Tian .................. H04B 7/24
455/41.2
2014/0068248 A1   3/2014 Kobres et al.

* cited by examiner

NETWORK-BASED SECURE INPUT/OUTPUT (I/O) MODULE (SIOM)

BACKGROUND

Online or electronic security is a major issue in the industry. It seems a month does not go by without news of some major business having a security breach. Such breaches include government agencies, retail outlets, social media companies, and even major banks.

Whenever an enterprise believes that a secure fix to remedy a breach has been deployed, hackers quickly figure out a new way to breach their systems. In some cases, the breaches are not even within the systems of the enterprise; rather, the breaches can occur over network transmission lines that enter or exit the enterprise systems; the hackers use sniffing techniques to acquire copies of data packets being transmitted over the network lines and find a way to break any encryption being used (assuming encryption was being used).

Advances are being made to combat security issues. For example, in the retail industry where a retailer has to ensure the integrity of financial transactions at Point-Of-Sale (POS) terminals, Secure Input/Output (I/O) Modules (SIOMs) have been deployed within POS terminals. These SIOMs are physical modules integrated into the POS terminals. The SIOM is a gatekeeper that establishes and manages encrypted communications between endpoint devices that support secure communications. The SIOM acts as a traffic cop, enforcing security policies and routing messages across device controllers.

The SIOM and its associated processing are a localized system (within a POS terminal) connected to its endpoint devices over physical mediums, such as RS-232c serial ports, Universal Serial Bus (USB), FireWire, etc. A SIOM manages the security and policies for a single terminal and the integrated endpoint devices (peripherals) for that terminal.

However, many legacy POS terminals lack an integrated SIOM and deployment of a SIOM requires new hardware deployment. Moreover, if a retailer desires the security that a SIOM offers, then each of the retailer's POS terminals would have to have a SIOM installed thereon.

Therefore, there is a need for improved SIOM deployment and access that are independent of the current one-SIOM to one-terminal approach.

SUMMARY

In various embodiments, techniques for providing a network-based Secure Input/Output (I/O) Module (SIOM) are presented. According to an embodiment, a method for providing a Local-Area-Network (LAN)-based SIOM access is provided.

Specifically, pairing requests are received from two separate peripherals over a LAN, and a unique secure session is established with each peripheral using a secure protocol.

DETAILED DESCRIPTION

Figure 1A:
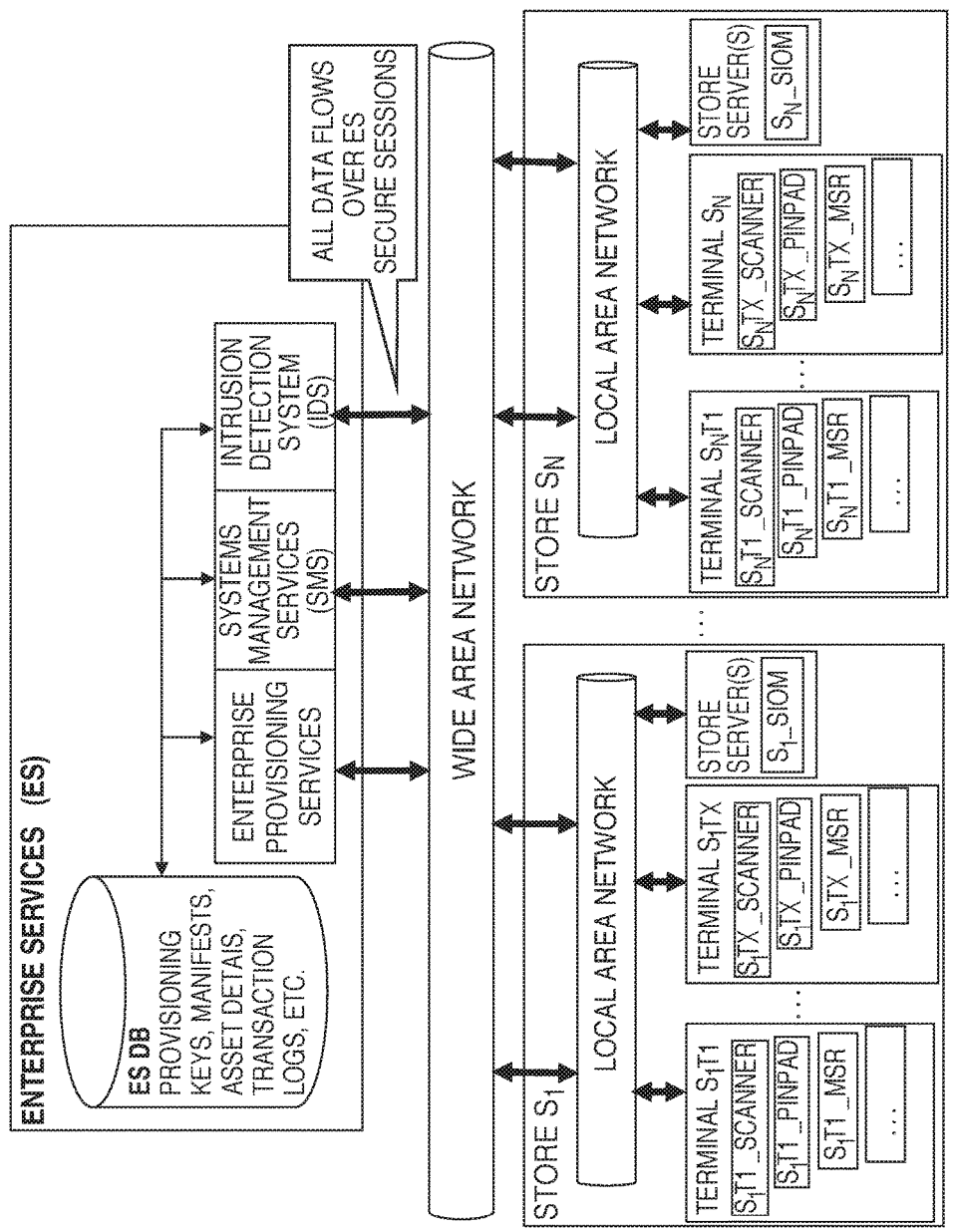
FIG. 1A is a diagram of an enterprise system that provides one network-based Secure Input/Output (I/O) Module (SIOM) per store for a retailer enterprise (multi-tenant configuration), according to an example embodiment.

FIG. 1A is a diagram of an enterprise system that provides one network-based Secure Input/Output (I/O) Module (SIOM) per store for a retailer enterprise, according to an example embodiment. The components of the enterprise system are shown in greatly simplified form with only those components shown necessary for the understanding of the various embodiments of the invention.

The enterprise system includes an enterprise service database, enterprise provisioning services, system management services, an Intrusion Detection System (IDS), a Wide-Area Network (WAN) and a plurality of retail stores. Each retail store includes a Local-Area Network (LAN), a LAN-accessible server, and a plurality of Point-Of-Sale (POS) terminals (may also be kiosks, Automated Teller Machines (ATMs), Self-Service Terminals (SSTs) or combinations thereof).

Each terminal includes a plurality of peripheral devices, such as but not limited to: scanners, pin pads, encrypted pin pads, Magnetic Strip/Card Readers (MSRs), printers, keyboards, displays, touch-screen displays, value-media dispensers, and the like.

The LAN-accessible server includes a single SIOM for the retail store for which the server is deployed. That is, there is just one SIOM per store that services multiple terminals within that store and each of the plurality of peripheral devices within each terminal.

All data that flows through the enterprise system occurs via secure sessions using a secure protocol. That is, a secure protocol defines custom encryption (encryption algorithms, encryption keys, and encryption key sizes) for each secure session (designated by a single bi-directional arrow in the FIG. 1A). Data flowing up or down through multiple secure sessions within the enterprise system can use different custom encryption for each separate secure session, which is managed by the secure protocol.

Each SIOM (one per store) controls message passing to and from the independent peripheral devices of those peripheral devices' terminals within the store through a secure LAN session.

The enterprise database houses provisioning keys (for encryption, decryption, authentication, and the like), manifests (security rules, security policies, encryption algorithms/techniques, certificates, keys, security permissions, security roles, etc.), asset details (identifiers for devices, capabilities of devices, software resources, versioning information, etc.), transactions logs (for each retail store, for each terminal within a store, and for each peripheral device within each terminal), and other desired enterprise information desired to be collected and housed in the enterprise database.

The enterprise provisioning services are responsible for securely provisioning each SIOM of each store with a manifest from the enterprise database. This is achieved over the network using a secure encryption protocol over a secure session via the WAN connection. The manifest details how each per-store SIOM is to securely communicate with and monitor security for each of the terminals and associated peripheral devices that the per-store SIOM services. For example, one encryption algorithm and set of keys for data payload passing to and from a particular scanner of a particular store may use a completely different encryption algorithm and set of keys for data payload passing to and from a particular pin pad within the same terminal of the same store or a complete different encryption for a different scanner associated with a different terminal within the same store.

The LAN-based SIOM initiates a provisioning request for its manifests over secure sessions to the provisioning services. The provisioning services obtain the provisioning manifests from a hardware security module that is associated with the enterprise database and proceeds to provision the requesting LAN-based SIOM. Once provisioned, the peripherals re-establish their secure sessions with the requesting SIOM.

Each peripheral device, via its Secure Device Controller (SDC), establishes a one-to-one pairing (independent secure session) over the LAN with the LAN-based SIOM when each peripheral device is powered up. The request for pairing is securely transported over the LAN through a secure session to the store server where the LAN-based SIOM resides. Thus, a Man-In-The Middle (MITM) attack would be of no value to a hacker because the same level of security that is deployed with a per-terminal SIOM deployment is used with the LAN-based SIOM (utilizing the secure sessions managed by the secure protocol). This is so, even though peripheral-to-SIOM communication is a LAN-based communication and not a direct device-to-device communication over a direct physical connection between a SIOM and a peripheral device.

The LAN-based SIOM deployment depicted in the FIG. 1A supports a multi-tenant SIOM technique. Each LAN-based SIOM is provisioned with several manifests; one manifest for each terminal including provisioning details for all the peripherals within that terminal. So, multiple terminals within a single store are supported by its single LAN-based SIOM (multi-tenant SIOM technique).

Figure 1B:
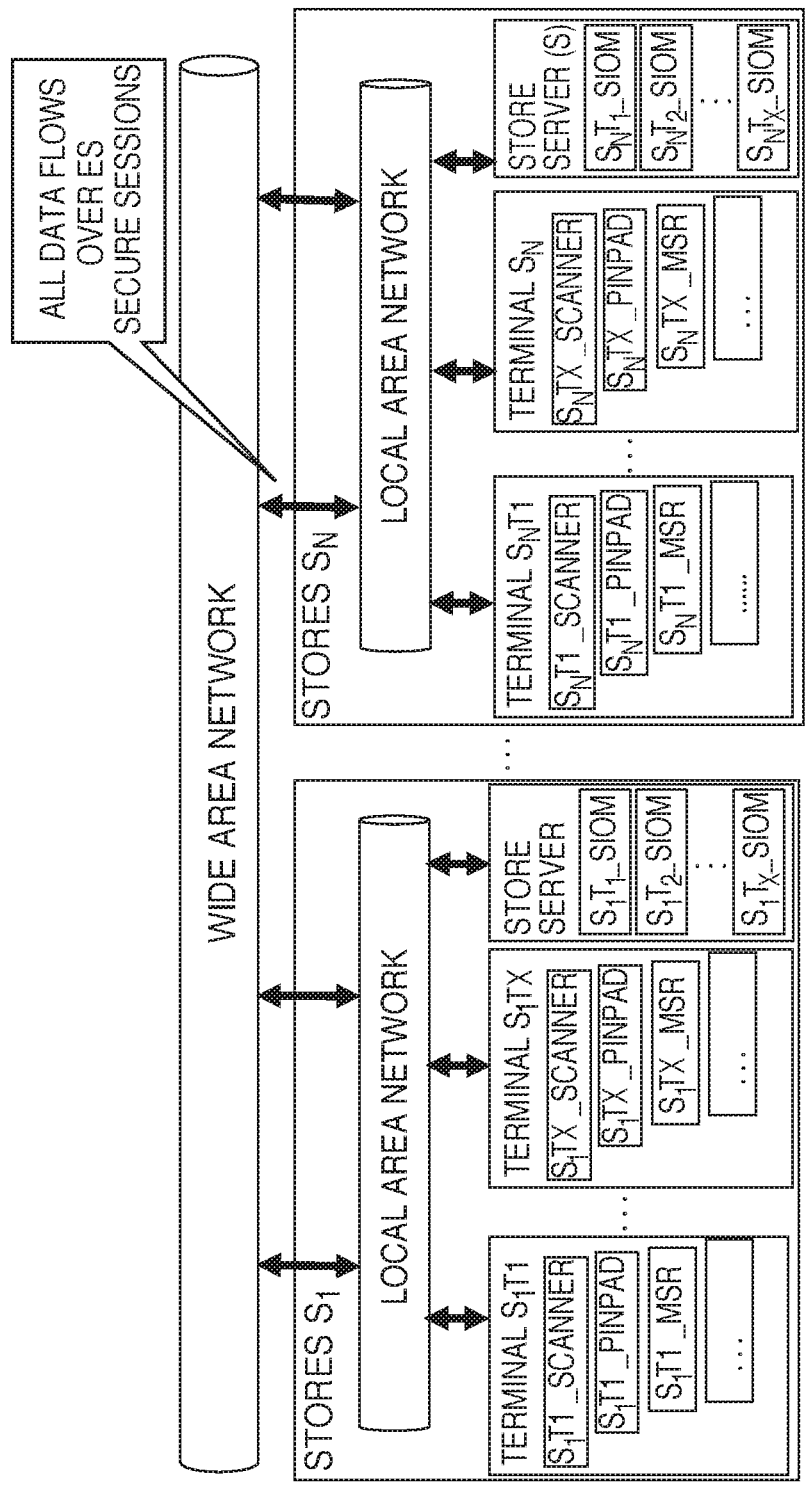
FIG. 1B is a diagram of an enterprise system that provides Local-Area Network (LAN) with single-tenant access to SIOMs within a store for retailer enterprise, according to an example embodiment.

FIG. 1B is a diagram of an enterprise system that provides LAN with single-tenant access to SIOMs within a store for retailer enterprise, according to an example embodiment.

In the configuration depicted in the FIG. 1B, a separate single LAN-based SIOM is dedicated to each terminal within a store. These LAN-based SIOMs are hosted over store's server. This technique provides the same level of security as that which was depicted in the FIG. 1A. The enterprise components depicted in the FIG. 1A are also present in the configuration shown in the FIG. 1B, but were removed from depiction in the FIG. 1B for ease of comprehension to illustrate just the pertinent changes in the single-tenant LAN-based SIOM approach from the multi-tenant LAN-based SIOM approach.

Again, (as was the case in the multi-tenant LAN-based SIOM approach), the SDC and LAN-based SIOM pairing requests are initiated by the peripheral devices on power up and all communication occurs via secure sessions over the LAN within a store.

However, in the FIG. 1B (as opposed to the FIG. 1A), each SIOM within a store's server is provisioned with a single manifest corresponding to a single terminal that the SIOM manages.

So, in the FIG. 1B multiple SIOMs are hosted in the store's server room where the store's server resides. There can be one host server per SIOM (each server hosting one SIOM) or specifically configured hardware can allow hosting multiple SIOMs on a single store's server. In either configuration, all SIOMs within a single store connected to their respective terminal peripherals via secure sessions over the LAN, and have access to the enterprise system components accessible over the WAN (depicted in the FIG. 1A.) for provisioning.

Figure 1C:
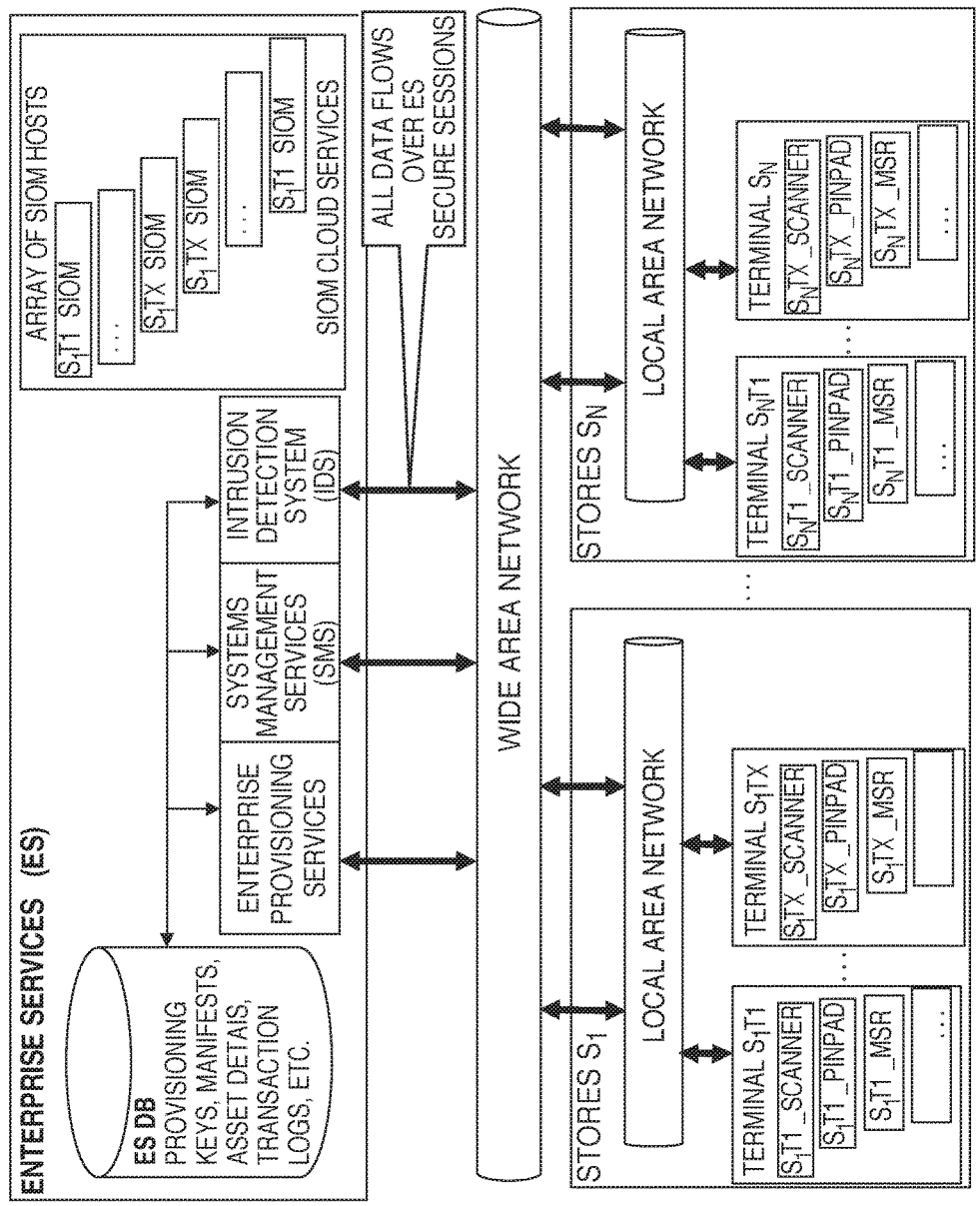
FIG. 1C is a diagram of an enterprise system that provides Wide-Area Network (WAN) with single-tenant or multi-tenant access to SIOMs within a store for retailer enterprise, according to an example embodiment.

FIG. 1C is a diagram of an enterprise system that provides WAN with single-tenant or multi-tenant access to SIOMs within a store for retailer enterprise, according to an example embodiment.

The FIG. 1C provides a third approach to the network-based SIOM techniques discussed herein. The network-based SIOMs are moved to the WAN-accessible enterprise system components providing an end-to-end Security-as-a-Service option for customers. This configuration can include either a multi-tenant SIOM approach (as shown in the FIG. 1A) and/or a single-tenant SIOM approach (as shown in the FIG. 1B). In fact, a hybrid approach can be used where some stores use the configuration of the FIG. 1C for a multi-tenant approach and other stores use the same configuration of the FIG. 1C for a single-tenant approach.

The FIG. 1C provides the same level of security presented in the configurations of the FIGS. 1A and 1B using the manifest provisioning and the secure sessions provided through the secure protocol.

The enterprise system provides a cloud-based SIOM configuration. The SDC for each peripheral makes a one-to-one secure session pairing request with its SIOM over the LAN and through the WAN. All communication is secured and transported over both the LAN and the WAN.

Moreover, every peripheral communicates through the enterprise SIOM service for pairing, which is optimized for extreme responsiveness and low latency.

As noticed in the FIG. 1C (as compared to the FIGS. 1A and 1B), individual stores on a store's server is not required. Thus, additional space and computing for hosting one or more SIOMs within a store's IT infrastructure is not required nor is IT personnel to manage the SIOM(s) within the store.

The FIGS. 1A-1C demonstrate that, inter alia: i) a SIOM does not have to reside on the same physical host (terminal) as the peripherals, ii) a network-based SIOM can support multiple provisioning manifests (one for each terminal), iii) a network-based SIOM can simultaneously service multiple terminals and each terminals multiple peripherals, iv) security protocol communications remain consistent with the network-based SIOM approach except the data is transported over one or more networks (LAN and/or WAN) with a same level of inherent security maintained, and v) a network-based SIOM permits SIOM-level security to be deployed to legacy or existing terminals that lack a physically built-in SIOM.

The above-discussed embodiments and other embodiments are now discussed with reference to the FIGS. 2-4.

Figure 2:
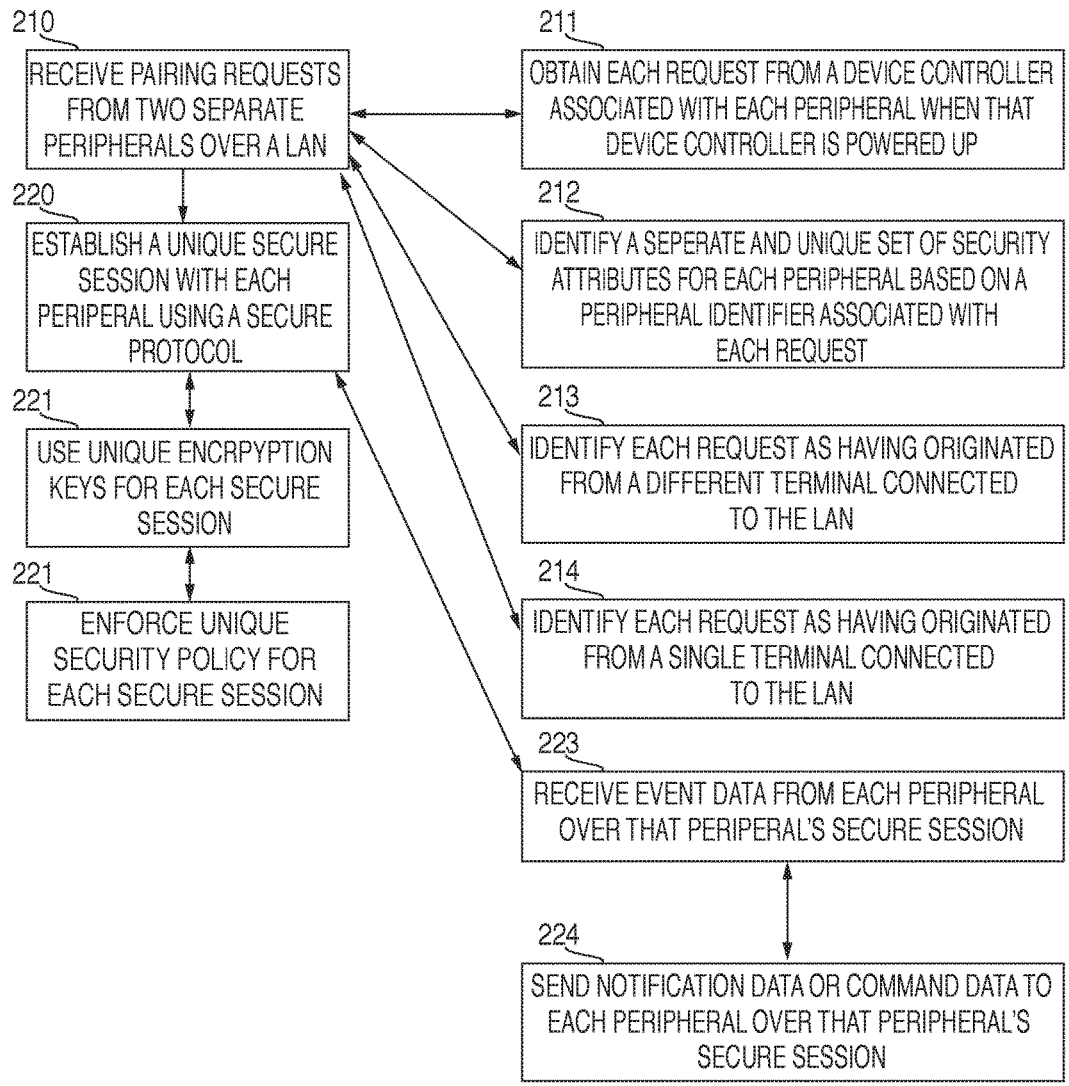
FIG. 2 is a diagram of a method for providing LAN-based SIOM access, according to an example embodiment.

FIG. 2 is a diagram of a method 200 for providing LAN-based SIOM access, according to an example embodiment. The method 200 (hereinafter "LAN-based SIOM service") is implemented as instructions programmed and residing in memory or on a non-transitory computer-readable (processor-readable) storage medium and executed by one or more processors of a server. The processors are specifically configured and programmed to process the LAN-based SIOM service. The LAN-based SIOM service operates over LAN and has access to a WAN through the LAN.

In an embodiment, the LAN-based SIOM service is executed by the server depicted in the FIGS. 1A and 1B.

At 210, the LAN-based SIOM service receiving pairing requests from two separate peripheral devices.

In an embodiment, the peripheral devices are one or more of: a scanner, a MSR, a value-media dispenser, a pin pad, an encrypted pin pad, a printer, keyboard, a camera, a display, and a touch-screen display.

In an embodiment, each peripheral device is a different type of peripheral from the other peripheral device.

According to an embodiment, at 211, the LAN-based SIOM service obtains each request from a device controller associated with each peripheral device when that device controller is powered up. So, the I/O controller for each peripheral requests a pairing to the LAN-based SIOM service when it is powered up. This permits I/O being directed to and from each peripheral device to be managed through the LAN-based SIOM service within the terminal for which each peripheral device is integrated.

In an embodiment, at 212, the LAN-based SIOM service identifies a separate and unique set of security attributes for each peripheral based on a peripheral identifier associated with each request. The LAN-based SIOM service is initially provisioned via one or more security manifests that defines each unique set of security attributes for securely communicating with each of the peripherals using a secure protocol (as discussed above with reference to the FIGS. 1A-1C).

In an embodiment, at 213, the LAN-based SIOM service identifies each request as having originated from a different terminal connected to the LAN. This is a multi-tenant network-based SIOM configuration as described above with reference to the FIG. 1A.

In an embodiment, at 214, the LAN-based SIOM service identifies each request as having originated from a single terminal connected to the LAN. This is a single-tenant network-based SIOM configuration as described above with reference to the FIG. 1B.

At 220, the LAN-based SIOM service establishes a unique secure session with each peripheral using a secure protocol.

According to an embodiment, at 221, using unique encryption for each secure session. That is, each secure session has one or more of: unique encryption algorithms, encryption keys, and encryption keys from that of the other secure session.

In an embodiment of 221 and at 222, the LAN-based SIOM service enforces unique security policy for each secure session. So, each secure session has a unique set of security rules that the LAN-based SIOM service enforces during each of the secure sessions.

In an embodiment, at 223, the LAN-based SIOM service receives event data from each peripheral device over that peripheral device's secure session. This can be forwarded from the LAN-based SIOM service to a centralized management server, such as the enterprise system discussed above with reference to the FIGS. 1A-1C.

In an embodiment of 223 and at 224, the LAN-based SIOM service sends notification data or command data to each peripheral over that peripheral's secure session. In an embodiment, the command data is an action that a peripheral device is directed to process that was sent downstream from the centralized management server.

Figure 3:
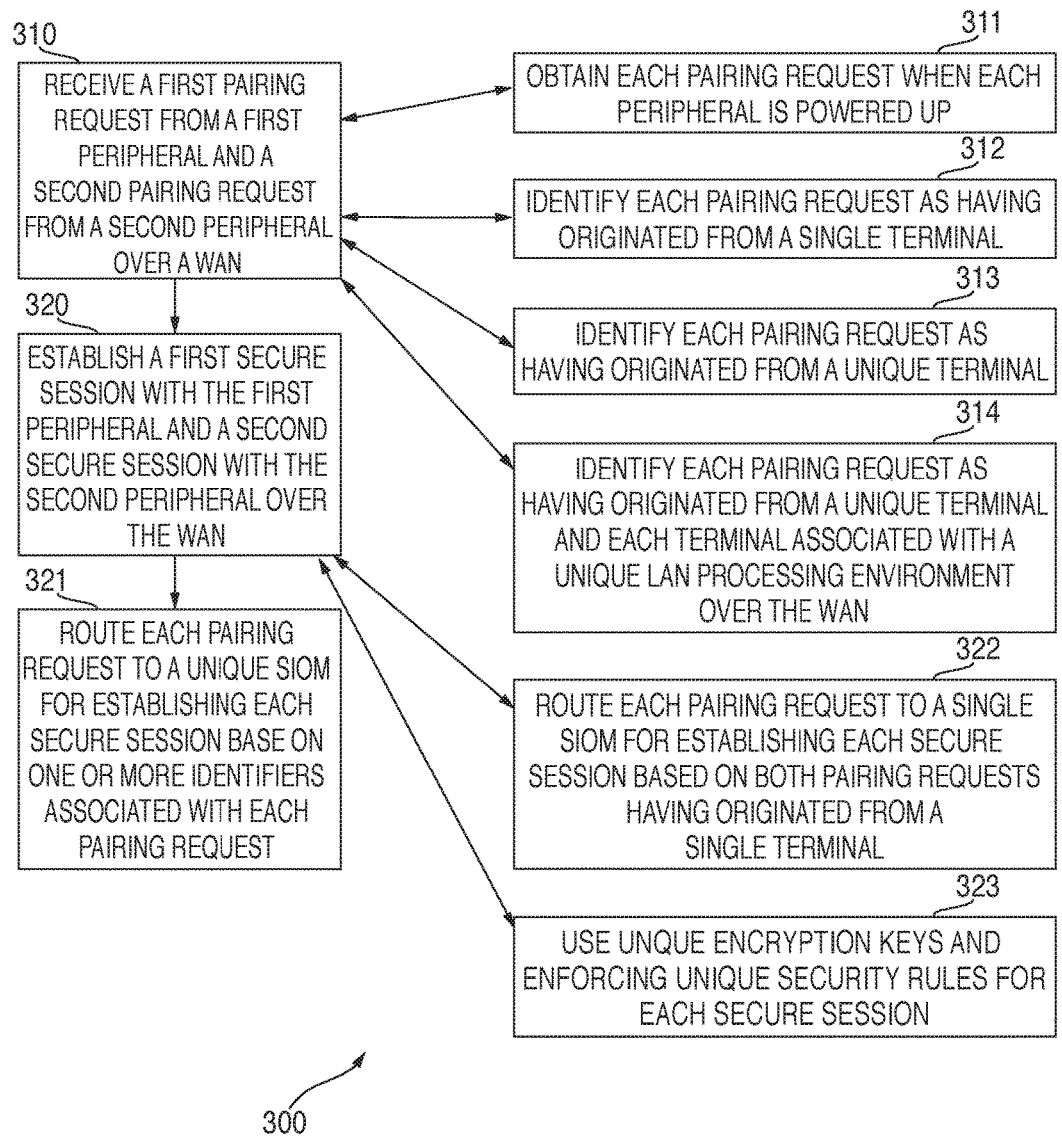
FIG. 3 is a diagram of a method for providing WAN-based SIOM access, according to an example embodiment.

FIG. 3 is a diagram of a method 300 for providing WAN-based SIOM access, according to an example embodiment. The method 300 (hereinafter "WAN-based SIOM service") is implemented as instructions and programmed within memory or a non-transitory computer-readable (processor-readable) storage medium that executes on one or more processors of a server; the processors of the device are specifically configured to execute the WAN-based SIOM service. The WAN-based SIOM service is also operational a WAN.

In an embodiment, WAN-based SIOM service is executed on the server depicted in the FIG. 1C.

At 310, the WAN-based SIOM service receives a first pairing request from a first peripheral and a second pairing request from a second peripheral. It is noted that the requests do not have to be received at the same time; although in some cases they can be received simultaneously.

According to an embodiment, at 311, the WAN-based SIOM service obtains each pairing request when each peripheral is powered up.

In an embodiment, at 312, the WAN-based SIOM service identifies each pairing request as having originated from a single terminal. This is a configuration of the single-tenant network-based SIOM discussed above in the FIG. 1C.

In an embodiment, at 313, the WAN-based SIOM service identifies each pairing request as having originated from a unique terminal. This is a configuration of the multi-tenant network-based SIOM discussed above in the FIG. 1C.

In an embodiment, at 314, the WAN-based SIOM service identifies each pairing request as having originated from a unique terminal and each terminal associated with a unique LAN-processing environment over the WAN. This is a multi-store, cloud-based, and Security-as-a-Service configuration discussed above in the FIG. 1C.

At 320, the WAN-based SIOM service establishes a first secure session with the first peripheral and a second secure session with the second peripheral over the WAN. The timing of the establishment of the secure sessions can occur in any order and/or simultaneously. Moreover, the first secure session can be terminated or ended before the second secure session is established.

According to an embodiment, at 321, the WAN-based SIOM service routing each pairing request to a unique SIOM to establish each secure session based on one or more identifiers associated with reach pairing request. The identifiers can identify one or more of: a LAN processing environment for the single SIOM, the terminal from which both pairing requests originate, and each of the peripheral. This is a WAN-based single tenant situation as discussed in the FIG. 1C above.

In an embodiment, at 322, the WAN-based SIOM service uses unique encryption and enforces unique secure rules for each of the secure sessions.

Figure 4:
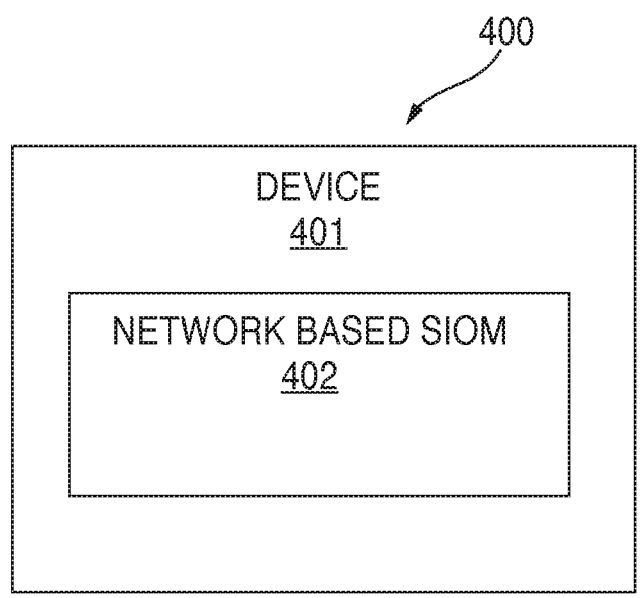
FIG. 4 is a diagram of a network-based SIOM system, according to an example embodiment.

FIG. 4 is a diagram of a network-based SIOM system 400, according to an example embodiment. Some components of the network-based SIOM system 400 are implemented as executable instructions and programmed within a non-transitory computer-readable (processor-readable) storage medium that execute on one or more processors of a network-enabled device; the processors are specifically configured to execute the components of the network-based SIOM system 400. The network-based SIOM system 400 is also operational a LAN and/or WAN.

In an embodiment, the network-based SIOM system 400 implements, inter alia, the network-based SIOMs presented in the FIGS. 1A-1C.

In an embodiment, the network-based SIOM system 400 implements, inter alia, the method 200 of the FIG. 2.

In an embodiment, the network-based SIOM system 400 implements, inter alia, the method 300 of the FIG. 3.

The network-based SIOM system 400 includes a device 401 and a network-based SIOM 402.

In an embodiment, the device 401 is a WAN-accessible server.

In an embodiment, the device 401 is a LAN-accessible server.

The network-based SIOM 402 is configured and adapted to: execute on the device 401, pair with two or more separate peripheral devices over a network connection, and establish unique secure sessions with each peripheral device over the network.

In an embodiment, the peripheral devices are one or more of: scanners, cameras, printers, pin pads, encrypted pin pads, value-media dispensers, MSRs, keyboards, displays, and touch-screen displays.

In an embodiment, the terminal or terminals within which the peripheral devices are integrated include one or more of: POS devices, ATMs, kiosks, and SSTs.

According to an embodiment, the network-based SIOM 402 is further configured and adapted to provide the pairing and the establishment of the unique secure sessions over the network connection that is one of: a LAN connection and a WAN connection.

In an embodiment, the network-based SIOM 402 is further configured and adapted to provide the pairing and establishment as one of: a single-tenant service for a single terminal associated with both peripheral devices and a multi-tenant service for two or more terminals, each terminal associated with a unique one of the two or more peripheral devices.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
obtaining, by one or more processors of a hardware server, a manifest that identifies encryption algorithms, encryption keys, protocols, and encryption key sizes, and processing, by the hardware server, the encryption algorithms with the encryption keys, and the encryption key sizes as the protocols, and establishing, by the hardware server through the protocols, encrypted communication sessions with two peripherals over a Local-Area Network;
receiving, by one or more processors of the hardware server, pairing requests from the two separate peripherals over the LAN; and
establishing, by the one or more processors of the hardware server, a separate and unique secure session with each separate peripheral using information identified in the manifest for processing as a secure protocol, and managing each unique secure session with a different encryption and with a different encryption key size from that which is processed for a remaining unique secure session being processed for a remaining one of the two separate peripherals.

2. The method of claim 1, wherein receiving further includes obtaining each request from a device controller associated with each peripheral when that device controller is powered up.

3. The method of claim 1, wherein receiving further includes identifying a separate and unique set of security attributes for each peripheral based on a peripheral identifier associated with each request.

4. The method of claim 1, wherein receiving further includes identifying each request as having originated from a different terminal connected to the LAN.

5. The method of claim 1, wherein receiving further includes identifying each request as having originated from a single terminal connected to the LAN.

6. The method of claim 1, wherein establishing further includes using unique encryption for each secure session.

7. The method of claim 6, wherein using further includes enforcing unique security policy for each secure session.

8. The method of claim 1, wherein establishing further includes receiving event data from each peripheral over that peripheral's secure session.

9. The method of claim 8, wherein establishing further includes sending notification data or command data to each peripheral over that peripheral's secure session.

10. A method, comprising:
receiving, by one or more processors of a hardware server, a first pairing request from a first peripheral and a second pairing request from a second peripheral over a Wide-Area Network (WAN);
obtaining, by the one or more processors of the hardware server, a manifest that identifies encryption algorithms, encryption keys, protocols, and encryption key sizes, and processing, by the hardware server, the encryption algorithms with the encryption keys and the encryption key sizes as the protocols, and establishing, by the hardware server, through the protocols secure and encrypted communication sessions with the first peripheral and the second peripheral over the WAN; and
establishing, by the one or more processors of the hardware server, a first secure session with the first peripheral and a second secure session with the second peripheral over the WAN with the first secure session processing a first custom encryption identified from information in the manifest and the second secure session processing a second custom encryption identified from the information in the manifest, wherein the first custom encryption is different from the second custom encryption, and wherein the first custom encryption includes a different encryption key size processed during the first secure session from a second custom encryption key size processed during the second secure session.

11. The method of claim 10, wherein receiving further includes obtaining each pairing request when each peripheral is powered up.

12. The method of claim 10, wherein receiving further includes identifying each pairing request as having originated from a single terminal.

13. The method of claim 10, wherein receiving further includes identifying each pairing request as having originated from a unique terminal.

14. The method of claim 10, wherein receiving further includes identifying each pairing request as having originated from a unique terminal and each terminal associated with a unique Local-Area Network (LAN) processing environment over the WAN.

15. The method of claim 10, wherein establishing further includes routing each pairing request to a unique Secure Input/Output Module (SIOM) for establishing each secure session based on one or more identifiers associated with each pairing request.

16. The method of claim 10, wherein establishing further includes routing each pairing request to a single Secure Input/Output Module (SIOM) for establishing each secure session based on both pairing requests having originated from a single terminal.

17. The method of claim 10 wherein establishing further includes using unique encryption and enforcing unique security rules for each secure session.

18. A system comprising:
a hardware server device;
a network-based secure input/output module (SIOM) configured and adapted to: i) execute on the hardware server device and pair with two separate peripheral devices over a network connection, ii) obtain a manifest that identifies encryption algorithms, encryption keys, protocols, and encryption key sizes, and process the encryption algorithms with the encryption keys and the encryption key sizes as the protocols to establish through the hardware server device using the protocols separate, secure, and encrypted communication sessions with each of the peripheral devices over the network connection, and iii) establish separate and unique secure sessions with each separate peripheral device over the network in response to the identifying and process a first encryption for a first one of the separate and unique secure sessions identified from information in the manifest and process a second encryption for a second of the unique secure session identified from the information in the manifest, wherein the first encryption uses a first encryption key size and encryption processed during the first one of the unique secure session that is different from a second encryption key and encryption size that is processed during the second of the unique secure sessions with the second encryption.

19. The system of claim 18, wherein the network-based SIOM is further configured and adapted to: iv) provide the pairing and establishment of the unique secure sessions over the network connection that is one of: a Local-Area Network (LAN) connection and a Wide-Area Network (WAN) connection.

20. The system of claim 18, wherein the network-based SIOM is further configured and adapted to: iv provide the pairing and the establishment as one of: a single-tenant service for a single terminal associated with both peripheral devices and a multi-tenant service for two terminals, each terminal associated with a unique one of the two peripheral devices.

* * * * *